United States Patent [19]

Inoue

[11] Patent Number: 4,891,946
[45] Date of Patent: Jan. 9, 1990

[54] APPARATUS FOR CONTROL OF OPERATIONAL CHARACTERISTICS OF SUPERCHARGER IN INTERNAL COMBUSTION ENGINE

[75] Inventor: Kazuo Inoue, Tokyo, Japan

[73] Assignee: Honda Giken Kogyo Kabushiki Kaisha, Tokyo, Japan

[21] Appl. No.: 748,695

[22] Filed: Jun. 25, 1985

Related U.S. Application Data

[63] Continuation of Ser. No. 567,614, Jan. 3, 1984, abandoned, which is a continuation of Ser. No. 276,086, Jun. 22, 1981, abandoned.

[30] Foreign Application Priority Data

Jun. 24, 1980 [JP] Japan ................................. 55-84577

[51] Int. Cl.⁴ .............................................. F02B 37/12
[52] U.S. Cl. ................................... 60/602; 364/431.04
[58] Field of Search ................ 60/600, 601, 602, 603, 60/611; 123/480, 486, 501, 564; 364/200, 900, 431.03, 431.04, 431.12

[56] References Cited

U.S. PATENT DOCUMENTS

| | | | |
|---|---|---|---|
| 1,856,024 | 4/1932 | Buchi | 60/603 |
| 3,173,242 | 3/1965 | Erickson | 60/601 |
| 3,925,989 | 12/1975 | Pustelnik | 60/602 |
| 4,084,242 | 4/1978 | Conti | 364/466 |
| 4,197,711 | 4/1980 | Fuhrmann et al. | 60/602 |
| 4,223,644 | 9/1980 | Latsch et al. | 123/440 X |
| 4,265,200 | 5/1981 | Wessel et al. | 123/501 |
| 4,292,806 | 10/1981 | Moore et al. | 60/600 |
| 4,319,327 | 3/1982 | Higashiyama et al. | 123/480 |
| 4,348,728 | 9/1982 | Sagisaka et al. | 123/480 |

FOREIGN PATENT DOCUMENTS

| | | | |
|---|---|---|---|
| 3002701 | 6/1981 | Fed. Rep. of Germany | 60/600 |
| 84818 | 6/1980 | Japan | 60/602 |

*Primary Examiner*—Michael Koczo
*Attorney, Agent, or Firm*—Armstrong, Nikaido, Marmelstein, Kubovcik & Murray

[57] ABSTRACT

An apparatus is provided for controlling the operational characteristics of a supercharger in an internal combustion engine with the supercharger, including a compressor. The apparatus comprises a pressure sensor positioned in an intake passage downstream of the compressor for detecting the pressure of the compressor at a revolution sensor operatively coupled to the engine for detecting the revolution speed of the engine. An arithmetic means has its inputs coupled to the pressure sensor and revolution sensor and arithmetically operates on the output signals of the pressure sensor and revolution sensor in accordance with predetermined control characteristics for providing an output signal in accordance therewith. A control means is coupled to the output of the arithmetic means for controlling the pressure of the compressor in accordance with the output signal of the arithmetic means, and changing means are provided for manually changing the predetermined control characteristics of the arithmetic means.

8 Claims, 1 Drawing Sheet

APPARATUS FOR CONTROL OF OPERATIONAL CHARACTERISTICS OF SUPERCHARGER IN INTERNAL COMBUSTION ENGINE

This application is a continuation of application Ser. No. 567,614 filed Jan. 3, 1984, abandoned, which was a continuation of application Ser. No. 276,086, filed June 22, 1981, abandoned.

BACKGROUND OF THE INVENTION

This invention relates to a control apparatus for the operational characteristics of a supercharger in an internal combustion engine, that is, for controlling the supercharging characteristics of the engine, chiefly used for a vehicle such as a motorcycle or the like.

In general, it is desirable to be able to control the operational characteristics of a supercharger. That is, the supercharging characteristics should be freely, manually changeable. Accordingly, the output characteristics of the engine can be changed freely in accordance with a user's or driver's desire. For instance, it is desirable to be able to select at will the operation of a motorcycle as either a sports or racing type or as a family or cruising type.

SUMMARY OF THE INVENTION

It is the primary object of the present invention to provide an apparatus for controlling the operational characteristics of a supercharger.

It is another object of the present invention to provide an apparatus for controlling the operational characteristics of a supercharger wherein the apparatus includes means for changing the operational characteristics.

It is a further object of the present invention to provide a means for manually changing the operational characteristics of the supercharger.

The present invention is directed to an apparatus for controlling the operational characteristics of a supercharger in an internal combustion engine with the supercharger, including a compressor. The apparatus comprises a pressure sensor positioned in an intake passage downstream of the compressor for detecting the pressure of the compressor and a revolution sensor operatively coupled to the engine for detecting the revolution speed of the engine. An arithmetic means has its inputs coupled to the pressure sensor and revolution sensor, and arithmetically operates on the output signals of the pressure sensor and revolution sensor in accordance with predetermined control characteristics for providing an output signal in accordance therewith. A control means is coupled to the output of the arithmetic means for controlling the pressure of the compressor in accordance with the output signal of the arithmetic means, and changing means are provided for manually changing the predetermined control characteristics of the arithmetic means.

DETAILED DESCRIPTION OF PREFERRED EMBODIMENTS

Figure 1:
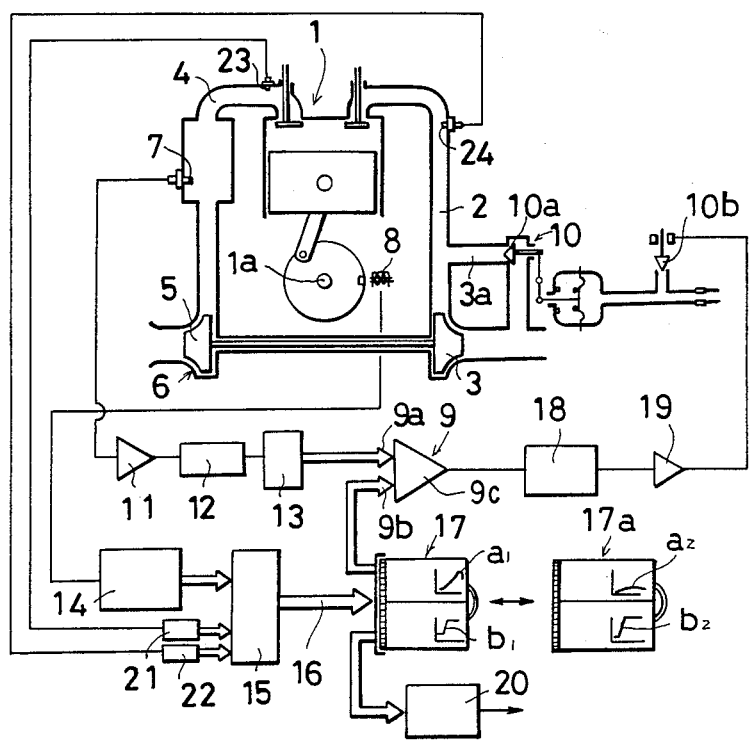
FIG. 1 is a schematic diagram of one embodiment of this invention.

Referring to the drawings, an internal combustion engine 1 for a motorcycle or the like is provided with a supercharger 6 comprising an exhaust turbine 3 provided in an exhaust passage 2 of the engine 1, and a compressor 5 provided in an intake passage 4 of the engine 1. The compressor 5 is driven by the turbine 3.

A pressure sensor 7 is provided on the downstream side of the compressor 5 for detecting the pressure of the compressor 5. A revolution sensor 8 is provided adjacent the crankshaft 1a of the engine 1 for detecting the speed of revolution of the engine 1. An arithmetic means 9 is provided for carrying out an arithmetic operation on output signals of the two sensors 7, 8 in accordance with predetermined control characteristics of a control means. A control means 10 controls the pressure of the compressor 5 in accordance with the output obtained from the arithmetic means 9.

The arithmetic means 9 comprises a comparator 9C, and is arranged so that the output signal of the pressure sensor 7 is applied to an input terminal 9a of the comparator 9C via a buffer circuit 11, a low-pass filter 12 and an A-D converter 13. The output signal of the revolution sensor 8 is applied to another input terminal 9b of the comparator 9C, via an arithmetic circuit 14, address decoder 15, an address line 16, and a memory 17. The elements including arithmetic circuit 14 (or arithmetic circuit means), address decoder 15 (or address decoder means), A/D converter 13, memory 17, and comparator 9c can be collectively referred to by the term processing means.

The memory 17 is set as to have predetermined control characteristics stored therein. That is, a characteristic curve $a_1$ of a relationship between revolution speeds and pressures has been previously stored therein. Thus, the actual pressure detected at the pressure sensor 7 and the set pressure stored in the memory 17 are compared to one another in the comparator 9C, so that a corresponding outcome signal may be obtained on the output side of the comparator 9C. The control means 10 is operated in accordance with the output signal of the foregoing comparison and serves to vary the actual pressure so it is equal to the set pressure. The control means 10 comprises a waste gate valve 10a interposed in a bypass 3a of the turbine 3 and a frequency or control valve 10b for controlling the positive pressure in the intake passage that acts on the valve 10a. The output signal of the comparator 9C is applied to an operating solenoid for the valve 10b through a controller 18 and a power amplifier 19, such that the pressure of the compressor 5 may be controlled in a predetermined manner through the waste gate valve 10a.

Though, as mentioned above, the arithmetic means 9 carries out the arithmetic operation in accordance with the predetermined control characteristics, it is so arranged, according to this invention, that the control characteristics can be manually changed for any desired use. Namely, in the illustrated example, in FIG. 1, the memory 17 can be replaced by another memory 17a at will as an occasion demands. The other memory 17a has another characteristic curve $a_2$ previously stored therein.

The memory 17 and the other memory 17a can be carried, for example, in plug-in type modules which simply connect into a socket on the apparatus. Thus, when a different operational characteristic for the supercharger is desired, memory 17 can be unplugged and removed, and memory 17a can be plugged in or vice versa.

In the illustrated embodiment in FIG. 1, the memory 17 has additionally a characteristic curve $b_1$ of the relationship between revolution speeds and ignition angles previously stored therein, and this characteristic curve $b_1$ can be replaced with another characteristic curve $b_2$ additionally provided in the other memory 17a.

The operation of this invention apparatus will be explained as follows:

When the memory 17, for instance, is in use as illustrated, the relationship between the pressure of the compressor 5 and the revolution speed of the engine 1 become equal to those shown by the curve $a_1$. In other words, the supercharging characteristics of the supercharger 6 becomes equal to that shown by the curve $a_1$. Accordingly, if the revolution speed is increased, the pressure of the compressor 5 is greatly increased to offer a large supercharging effect. If the memory 17 is then replaced manually by the other memory 17a, the operation characteristics becomes equal to that shown by the curve $a_2$. Accordingly, in this case, even if the revolution speed is increased, the pressure of the compressor 5 is not so greatly increased, and thus the increase in the supercharging effect becomes small.

In FIG. 1, an ignition timing control means 20, a boost pressure compensating circuit 21, a back pressure compensating circuit 22, a boost pressure sensor 23, and a back pressure sensor 24 can be provided in the engine.

Figure 2:
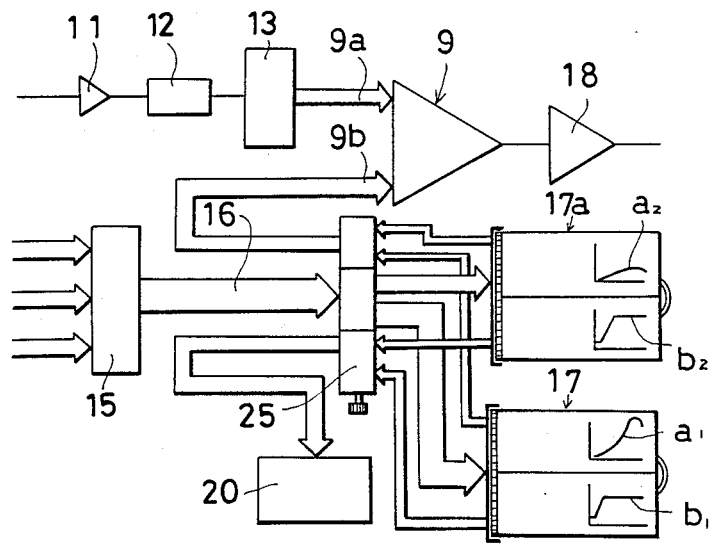
FIG. 2 is a schematic diagram of a portion of a modified embodiment thereof.

As another changing means for exchanging between the memory 17 and the memory 17a, a data selector 25 may be utilized as shown in FIG. 2. In this embodiment, the memory 17 and the memory 17a can be selectively operated by the data selector 25.

Thus, according to this invention, by changing the memory to that of different control characteristics at will, the operational characteristics of the supercharger are changed. This is advantageous in that a single engine can be operated at any one of several desired output characteristics.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for controlling the operational characteristics of a supercharger in an internal combustion engine, the supercharger including a compressor, said apparatus comprising:
   a pressure sensor positioned in an intake passage downstream of the compressor for detecting the pressure of the compressor;
   a revolution sensor operatively coupled to the engine for detecting the revolution speed of the engine;
   a processing means having inputs thereof coupled to the pressure sensor and revolution sensor, said processing means including,
   (a) an arithmetic circuit means operatively connected to said revolution sensor for receiving the output thereof which corresponds to the speed of the engine,
   (b) an address decoder means having a plurality of inputs and being operatively connected at one end of said inputs to said arithmetic circuit means for receiving the output thereof,
   (c) an analog-to-digital converter, operatively connected to said pressure sensor to receive the output thereof,
   (d) changeable memory means operatively connected to said address decoder for storing predetermined reference pressure values corresponding to specific revolution speeds of the engine and, in response to input from said address decoder, provide an output pressure signal corresponding to the engine revolution speed signal as a predetermined control characteristic, and
   (e) a comparator receiving inputs from said analog-to-digital converter and said memory means, wherein said comparator compares the sensed pressure from the analog-to-digital converter to the output pressure signal from said memory means, and provides an output of the processing means in accordance with the comparison;
   control means coupled to the output of the processing means, for controlling the pressure of the compressor in accordance with the output signal of the processing means;
   structural means for accepting said memory means such that said memory means may be changed, thereby changing the predetermined control characteristic; and
   wherein a boost pressure sensor is provided in said intake passage downstream of said pressure sensor, said boost pressure sensor being connected to a boost pressure compensating circuit which in turn provides an input to said address decoder means.

2. An apparatus as claimed in claim 1, wherein the supercharger includes an exhaust turbine provided in an exhaust passage of the engine, the exhaust turbine being coupled to the compressor for driving the compressor, and wherein the control means comprises a waste gate valve positioned in a bypass of the exhaust turbine and a control valve for controlling the waste gate valve, the control valve being operated in response to the output signal of the processing means.

3. The apparatus of claim 1, wherein said structural means includes a socket such that said memory means can be changed manually.

4. The apparatus of claim 1, wherein said structural means includes a data selector such that said memory means can be changed without being removed.

5. An apparatus for controlling the operational characteristics of a supercharger in an internal combustion engine, the supercharger including a compressor, said apparatus comprising:
   a pressure sensor positioned in an intake passage downstream of the compressor for detecting the pressure of the compressor;
   a revolution sensor operatively coupled to the engine for detecting the revolution speed of the engine;
   a processing means having inputs thereof coupled to the pressure sensor and revolution sensor, said processing means including,
   (a) an arithmetic circuit means operatively connected to said revolution sensor for receiving the output thereof which corresponds to the speed of the engine,
   (b) an address decoder means having a plurality of inputs and being operatively connected at one end of said inputs to said arithmetic circuit means for receiving the output thereof, (c) an analog-to-digital converter, operatively connected to said pressure sensor to receive the output thereof, (d) changeable memory means operatively connected to said address decoder for storing predetermined reference pressure values corresponding to specific revolution speeds of the engine and, in response to input from said address decoder, provide an output pressure signal corresponding to the engine revolution speed signal as a predetermined control characteristic, and (e) a comparator receiving inputs from said analog-to-digital converter and said memory means, wherein said comparator compares the sensed pressure from the analog-to-digital converter to the output pressure signal from said memory means, and provides an output of the processing means in accordance with the comparison;

control means coupled to the output of the processing means, for controlling the pressure of the compressor in accordance with the input signal of the processing means;

structural means for accepting said memory means such that said memory means may be changed, thereby changing the predetermined control characteristics; and wherein a back pressure sensor is provided in an exhaust passage, said back pressure sensor being connected to a back pressure compensating circuit which in turn provides an input to said address decoder means.

6. An apparatus as claimed in claim 5, wherein the supercharger includes an exhaust turbine provided in an exhaust passage of the engine, the exhaust turbine being coupled to the compressor for driving the compressor, and wherein the control means comprises a waste gate valve positioned in a bypass of the exhaust turbine and a control valve for controlling the waste gate valve, the control valve being operated in response to the output signal of the processing means.

7. The apparatus of claim 5, wherein said structural means includes a socket such that said memory means can be changed manually.

8. The apparatus of claim 5, wherein said structural means includes a data selector such that said memory means can be changed without being removed.

* * * * *